United States Patent [19]

Khan et al.

[11] Patent Number: 5,965,299

[45] Date of Patent: Oct. 12, 1999

[54] COMPOSITE ELECTROLYTE CONTAINING SURFACE MODIFIED FUMED SILICA

[75] Inventors: Saad A. Khan, Cary; Peter S. Fedkiw, Raleigh, both of N.C.; Gregory L. Baker, Haslett, Mich.; Jiang Fan, Dublin, Calif.; Srinivasa R. Raghavan, Raleigh, N.C.; Jun Hou, Berkeley, Calif.

[73] Assignees: North Carolina State University, Raleigh, N.C.; Michigan State University, East Lansing, Mich.

[21] Appl. No.: 08/880,599

[22] Filed: Jun. 23, 1997

[51] Int. Cl.$^6$ .......................... H01M 6/18; H01M 10/08
[52] U.S. Cl. ..................... 429/313; 429/302; 429/303; 429/323
[58] Field of Search ...................... 429/192, 218, 429/302, 303, 313, 322, 323

[56] References Cited

U.S. PATENT DOCUMENTS

| | | | |
|---|---|---|---|
| 3,709,737 | 1/1973 | Fujimoto et al. | 136/148 |
| 3,776,779 | 12/1973 | Johnson | 136/157 |
| 4,007,122 | 2/1977 | Owens et al. | 252/62.2 |
| 4,317,872 | 3/1982 | Varma | 429/190 |
| 4,925,752 | 5/1990 | Fauteux et al. | 429/191 |
| 4,959,138 | 9/1990 | Brinkmann et al. | 204/414 |
| 4,990,413 | 2/1991 | Lee et al. | 429/191 |
| 5,011,501 | 4/1991 | Shackle et al. | 29/623.1 |
| 5,011,751 | 4/1991 | Yoneyama et al. | 429/192 |
| 5,168,019 | 12/1992 | Sugeno | 429/194 |
| 5,194,341 | 3/1993 | Bagley et al. | 429/189 |
| 5,219,682 | 6/1993 | Bones et al. | 429/193 |
| 5,360,686 | 11/1994 | Peled et al. | 429/191 |
| 5,472,808 | 12/1995 | Peled et al. | 429/192 |
| 5,486,435 | 1/1996 | Brochu | 429/192 |
| 5,523,181 | 6/1996 | Stonehart et al. | 429/192 |
| 5,529,707 | 6/1996 | Kejha | 252/62.2 |
| 5,576,115 | 11/1996 | Capuano et al. | 252/62.2 |

FOREIGN PATENT DOCUMENTS

| | | | |
|---|---|---|---|
| 0581296A2 | 2/1994 | European Pat. Off. | H01B 1/12 |
| 2582662 | 12/1986 | France | C09K 3/00 |
| 56-110606 | 9/1981 | Japan | A61K 6/02 |
| 04245170 | 9/1992 | Japan | C08K 9/00 |
| 06032863 | 2/1994 | Japan . | |
| 06140052 | 5/1994 | Japan . | |
| 08064028 | 3/1996 | Japan . | |
| 08209028 | 8/1996 | Japan | C09D 4/02 |
| WO94/02425 | 2/1994 | WIPO | C03C 17/28 |
| WO95/06332 | 3/1995 | WIPO | H01M 2/16 |
| WO96/31572 | 10/1996 | WIPO | C09J 11/04 |

OTHER PUBLICATIONS

Khan, S.A. et al.; *Composite Polymer Electrolytes Using Fumed Silica Fillers: Rheology and Ionic Conductivity*;Chem. Mater. 1994, 6:(12), pp. 2359–2363.

Hou, J.;*Composite Polymer Electrolytes Using Functionalized Fumed Silica and Low Molecular Weight PEO: Synthesis and Characterization*;(Abstract), (1997), Diss. Abstr. Int., B 1998, 58:(9), 4805, 1997.

(List continued on next page.)

*Primary Examiner*—Maria Nuzzolillo
*Assistant Examiner*—Mark Ruthkosky
*Attorney, Agent, or Firm*—Myers Bigel Sibley & Sajovec

[57] ABSTRACT

A composite electrolyte comprises (a) surface modified fumed silica filler, wherein the surface modified fumed silica comprises polymerizable groups on the surface thereof, the polymerizable groups being bonded to each other such that the surface modified fumed silica filler is crosslinked in a three-dimensional structure; (b) a dissociable lithium salt; and (c) a bulk medium which contains the surface modified fumed silica filler and the dissociable lithium salt. An electrochemical cell comprises an anode, a cathode, and a composite electrolyte dispersed between the anode and cathode.

52 Claims, 5 Drawing Sheets

OTHER PUBLICATIONS

Hou, J. et al.; *Preparation and Characterization of Cross–Linked Composite Polymer Electrolytes;*(Abstract) American Chemical Society, 1998.

Fan, J. et al.;*Composite Electrolytes Prepared from Fumed Silica, Polyethylene Oxide Oligomers, and Lithium Salts;*J. Electrochem Soc. 144:(2), Feb. 1997, pp. 399–408.

Raghavan, S.R. et al.: *Composite Polymer Electrolyted Based on Fumed Silica: Mechanical Response and Processability;*Electrochemical Society Proceedings vol. 96–17, Oct. 6–11, 1996, pp. 74–89.

Matsuo, Y. et al.: *Ionic conductivity of poly(ethylene glycol)–LiCF$_3$SO$_3$–ultrafine SiO$_2$ composite electrolytes: Effects of addition of the surfactant lithium dodecysulfate-;*Solid State Ionics 79 (1995) pp. 295–299.

Waddell, W.H. et al.; *Organic Polymer–Surface Modified Precipitated Silica;*Journal of Applied Polymer Science:(12) Mar. 21, 1995, pp. 1627–1641.

Fauteux et al., *Electrochimica Acta*, Lithium Polymer Electrolyte Recharageable Battery, pp. 2185–2190 (1995).

Bourgeat–Lami et al., *Die Angewandte Makromolekulare Chemie*, Emulison Polymerization in the Presence of Colloidal Silica Particles, pp. 105–122 (1996).

Fritz et al., *Journal of Power Sources*, A New Type of Electrolyte for Galvanic Elements, pp. 315–323 (1992).

Khan et al., *Chemistry of Materials*, Composite Polymer Electrolytes Using Fumed Silica Fillers: Rheology and Ionic Conductivity, pp. 2359–2363 (1994).

Croce et al., *Chemistry of Materials*, Electrochemical and Spectroscopic Study of the Transport Properties of Composite Polymer Electrolytes, pp. 1134–1136 (1992).

Gang et al., *Solid–State Ionics*, Comparison of NMR and Conductivity in (PEO)$_8$LiClO$_4$+γ–LiAlO$_2$, pp. 1102–1105 (1992).

Plocharski et al., *Solid State Ionics*, Peo Based Composite Solid Electrolyte containing Nasicon, pp. 979–982 (1987).

Wieczorek et al., *Electrochimica Acta*, Composite Polyether Based Solid Electrolytes, vol. 40, No. 13–14, pp. 2251–2259 (1995).

Appetecchi et al., *The Journal of Electrochemical Society*, A New Class of Advanced Polymer Electrolytes and Their Relevance in Plastic–like, Rechargeable Lithium Batteries, vol. 143, pp. 6–12 (1996).

Wieczorek et al., *Macromolcules*, Polyether, Poly (N,N–dimethylacrylamide), and LiClO$_4$ Composite Polymeric Electrolytes, pp. 143–261 (1996).

Koksbang et al., *Solid State Ionics*, Review of Hybrid Polymer Electroytes and Rechargeable Lithium Batteries, pp. 320–335 (1994).

Khan, S.A.; Baker, G.L.; Colson, S. "Composite Polymer Electrolytes Using Fumed Silica Fillers: Rheology and Ionic Conductivity", Chemistry of Materials, 1994, 6, 2359–63, Nov. 1994.

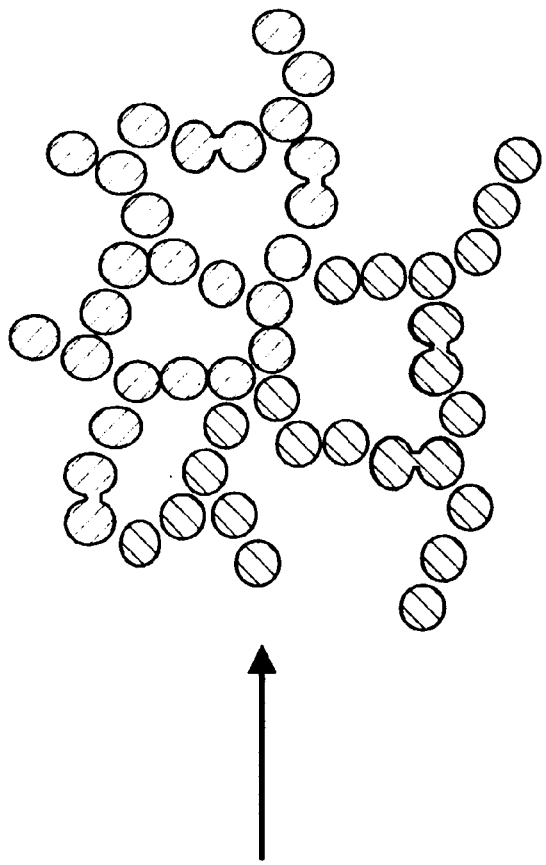
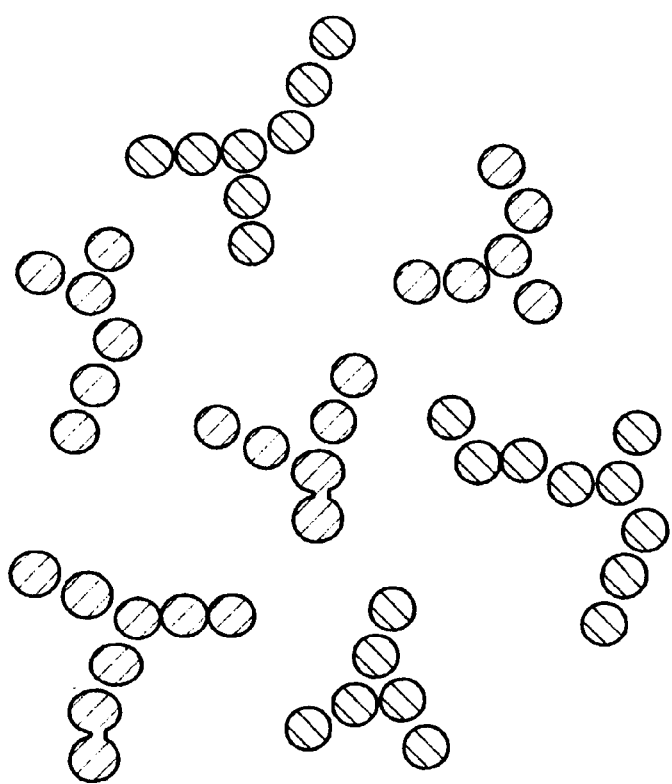

Fumed silica ⇩ Half-saturated NH₄NO₃
Hydrated Fumed Silica
Fumed silica - TOM ⇩ LiClO₄, butyl methacrylate, PEG-DM-500, AIBN, UV
Cross-linked Fumed Silica Composite

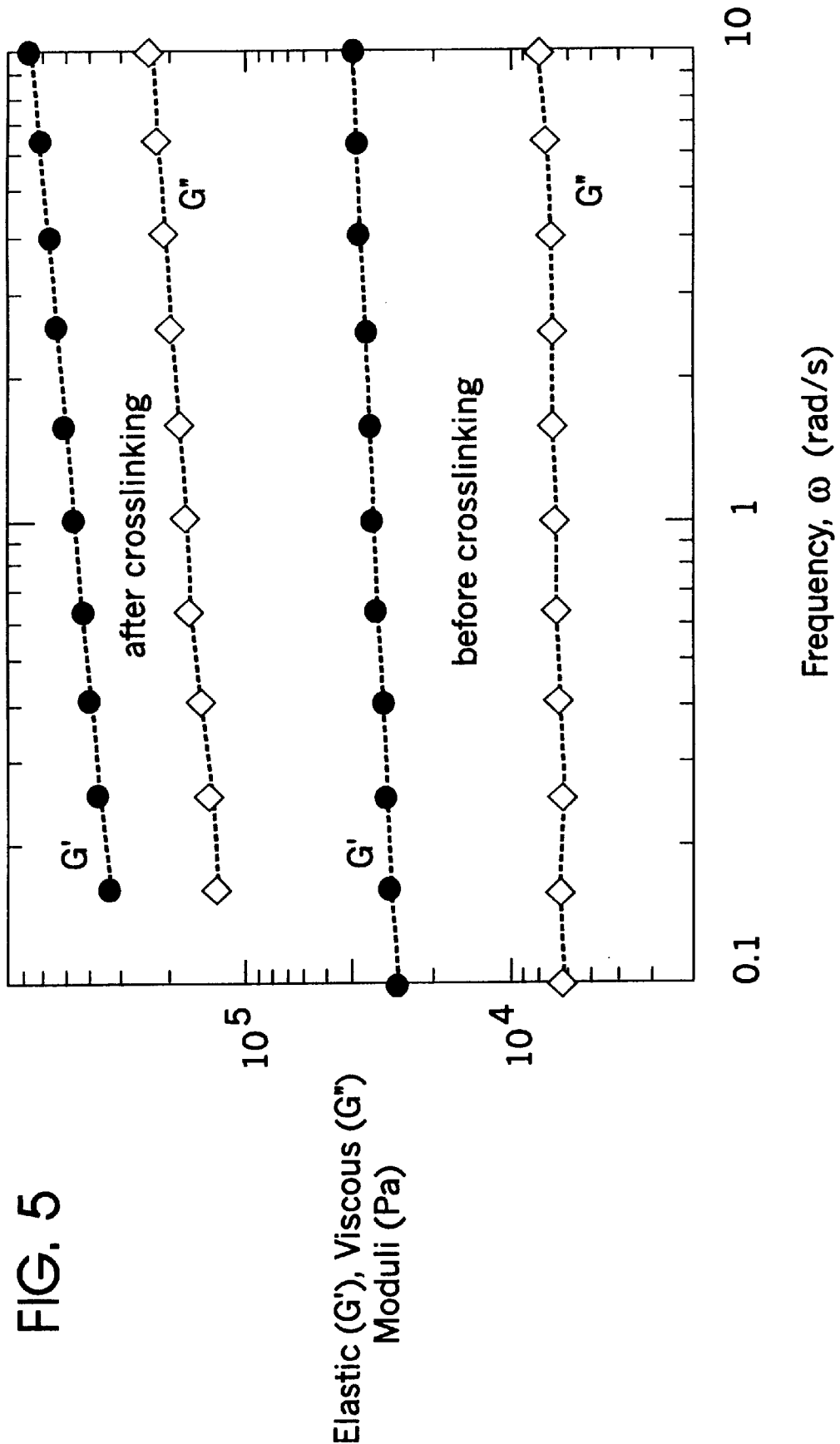

COMPOSITE ELECTROLYTE CONTAINING SURFACE MODIFIED FUMED SILICA

FIELD OF THE INVENTION

The present invention relates to electrolytes, and more particularly to electrolytes which are useful in, for example, electrochemical cells and batteries.

BACKGROUND OF THE INVENTION

Research in polymer electrolytes for use in rechargeable lithium and lithium-ion batteries has been ongoing for decades. However, performance of conventional electrolytes is still less than desirable. A long-standing goal of electrolyte research generally relates to the preparation of an electrolyte that combines the solid-like characteristics of conventional thermoplastics with the ionic conductivity of low molar mass liquids.

The majority of polymer electrolyte research has focused on employing polyethylene oxide (PEO) and PEO derivatives complexed with various lithium salts. A lithium salt dissolved in a high-molecular weight PEO by itself typically does not yield a room temperature conductivity sufficiently high enough for practical application in a lithium battery (i.e., greater than $10^{-3}$ S/cm). Various approaches have been attempted to develop solid electrolytes for lithium cells, which yield improved room temperature conductivity. Fauteux et al. [*Electrochimica Acta*, 1995, 40, 2185] has categorized these approaches into two classes, namely (1) "pure" solid polymer electrolyte systems, and (2) network or gel-polymer electrolyte systems, and Koksbang et al. [*Solid State Ionics*, 1989, 36, 320] has compiled examples of each class. In the first class, blends of polyethers which may be copolymerized with co-monomers can be used to lower the glass transition temperature $T_g$ and produce a polymer with reduced crystallinity. The class also includes co-polymers of polyether-grafted polyether, polysiloxane, or polyphosphazene backbones. Alternatively, plasticizers may be added to the PEO, either as an absorbed liquid or a plasticizing lithium salt, to attempt to effect an increase in conductivity.

In contrast, with respect to the gel-polymer electrolyte systems, the ionic conduction is believed to be due to the mobility of the ionic species in the liquid phase of the gel-polymer system. Gel electrolytes are typically prepared by dispersing liquid solvents (e.g., organic carbonates) and/or platicizers in an inert polymer. The ionic conductivity of the gel electrolyte is usually higher than the solid electrolyte, but at the expense of a less mechanically strong and electrochemically less stable system.

There remains a need in the art for electrolytes for use in electrochemical cells including lithium and lithium-ion batteries, which exhibit high conductivities and good mechanical properties. There is also a need for electrolytes which are more easily processable than conventional electrolytes. Moreover, there is a need for electrolytes which exhibit a higher level of electrochemical stability than those materials which are currently being used.

It is therefore an object of the present invention to provide a composite electrolyte which exhibits a high conductivity at room temperature. It is also an object of the present invention to provide a composite electrolyte which possesses good mechanical properties. It is another object of the present invention to provide a composite electrolyte which may be processed in an easier manner. It is yet another object of the present invention to provide a composite electrolyte which exhibits good electrochemical stability.

SUMMARY OF THE INVENTION

As a first aspect, the present invention provides a composite electrolyte. The composite electrolyte comprises a surface modified fumed silica filler, wherein the surface modified fumed silica comprises polymerizable groups on the surface thereof, the polymerizable groups being bonded to each other such that the surface modified fumed silica filler is crosslinked into a three-dimensional structure; a dissociable lithium salt; and a bulk medium which contains the surface modified fumed silica filler and the dissociable lithium salt.

As a second aspect, the present invention provides an electrochemical cell. The electrochemical cell includes an anode; a cathode; and interposed between the anode and the cathode, a composite electrolyte as described herein.

The foregoing and other objects and aspects of the present invention are explained further in the detailed description, examples, and figures set forth below.

BRIEF DESCRIPTION OF THE FIGURES

In the Figures which form a portion of the original disclosure:

FIG. 1 is a schematic representation of fumed silica. The diagram a represents single entities of fumed silica existing as branched chain-like aggregates. The diagram b represents a three-dimensional network structure formed by the agglomeration of fumed silica aggregates. These aggregates are composed of primary particles;

FIG. 5 is a graph illustrating the dynamic (elastic and viscous) moduli before and after crosslinking for composite electrolytes.

DETAILED DESCRIPTION OF THE INVENTION

Figure 2:
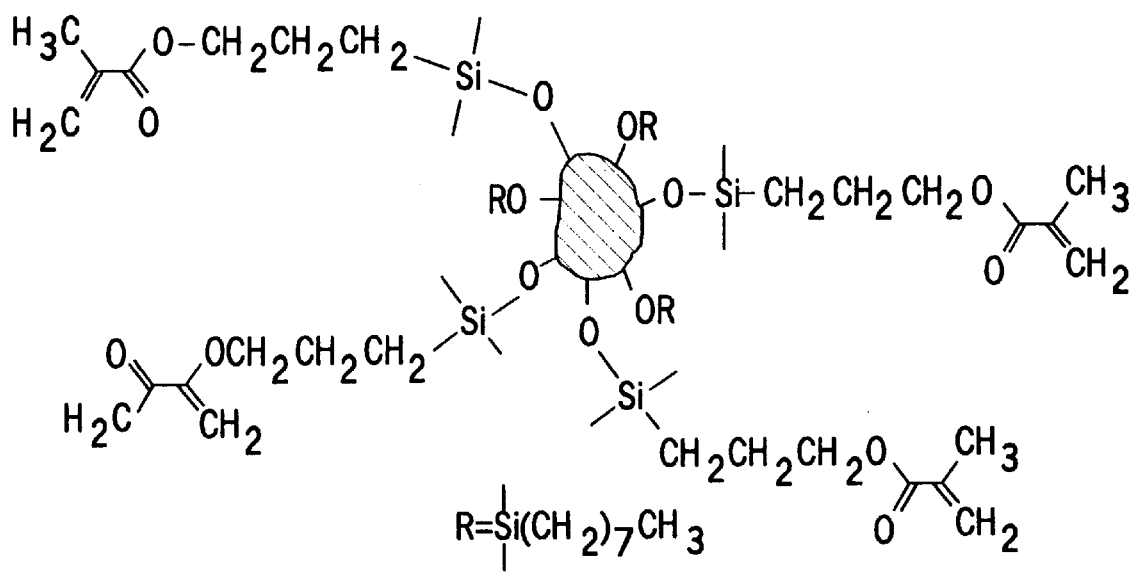
FIG. 2 illustrates a synthetic route for making a surface modified fumed silica. In this example, the silica possesses two different surface functionalities: (1) an octyl ($C_8$) chain which allows the silica to be hydrophobic; and (2) a propyl methacrylate moiety which can undergo crosslinking.

The invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

In one aspect, the invention relates to a composite electrolyte. The composite electrolyte comprises a surface modified fumed silica filler; a dissociable lithium salt, and a bulk medium which contains the surface modified silica filler and the dissociable lithium salt. For the purposes of the invention, the composite electrolyte is a non-aqueous electrolyte.

In accordance with the invention, the composite electrolyte includes surface modified fumed silica filler. Mixtures of various fumed silicas may be used. For the most part, the fumed silica initially contains silanol groups which may be replaced by polymerizable groups on the surface. The polymerizable groups are generally provided by reacting the fumed silica with one or more monomers which are described herein, such as, for example, surface reactive monomers which contain a surface active group (one which may react with a silanol) and a polymerizable group. Although a wide range of surface reactive monomers are contemplated by the invention, the surface reactive monomers are preferably of a hydrophobic nature, and thus have a hydrocarbon segment along with a polymerizable group. The hydrocarbon segment (preferably from $C_1$ to $C_{16}$ alkyl) of such a monomer is typically attached to the fumed silica with the polymerizable group being present on the end of the hydrocarbon segment. The length of the hydrocarbon segment may be adjusted according to the level of hydrophobicity that is desired. Surface modifiers in addition to the above monomers containing polymerizable groups may be used to provide a desired hydrophobic level such as , for example, octyltrimethoxy silane. The surface modifiers may contain various functional groups which may allow, for example, for the tailoring of certain physical, chemical, and electrochemical properties of the composite electrolyte. The term "functional groups" should be broadly interpreted to include those groups capable of undergoing a wide variety of reactions. Exemplary functional groups include, but are not limited to, cyclic and straight-chained ethers, alcohols, and the like. The polymerizable groups on the fumed silica are interconnected or bonded to each other such that said surface modified fumed silica filler is crosslinked and present as a three-dimensional network in the form of a flexible film. In other words, the polymerizable groups are present on various surface modified fumed silica units so as to bridge the units by a polymer chain. The three-dimensional structure allows the composite electrolyte to display good mechanical strength without adversely affecting electrical conductivity. The open nature of the three-dimensional structure facilitates rapid mobility of ions through the material, thereby providing excellent ionic conductivities. One significant aspect of the invention is that the mechanical and electrochemical properties of the electrolyte can be independently controlled.

The surface reactive monomers containing polymerizable groups generally include those components which are capable of undergoing free radical polymerization. Exemplary classes of polymerizable groups include, but are not limited to, methacrylates, acrylates, styrenes, alkenes, and mixtures thereof. Examples of suitable methacrylates useful for surface modification of the silica include trimethoxysilylpropyl methacrylate and trichlorosilyloctyl methacrylate. Additional monomers may also be added to the composite electrolyte that do not react with the surface of the fumed silica but may participate in the crosslinking reaction with the polymerizable groups. Exemplary classes of such monomers include, but are not limited to, methacrylates, acrylates, styrenes, alkenes, and mixtures thereof. Examples of suitable methacrylates include alkyl methacrylates such as, but not limited to, methyl methacrylate, butyl methacrylate, octyl methacrylate, and mixtures thereof.

The above monomer may be employed in various amounts. Preferably, the monomer is used in an amount ranging from about 1 to about 25 percent by weight, and more preferably from about 5 to about 10 weight percent. Preferably, about 30 to about 75 percent of the silanol groups of the fumed silica are replaced by polymerizable groups, and more preferably about 30 to about 60 percent of the silanol groups are replaced by polymerizable groups.

The surface modified fumed silica filler may be employed in different amounts. Preferably, the surface modified fumed silica filler is used in an amount ranging from about 1 to about 50 percent by weight of the composite electrolyte, and more preferably from about 10 to about 20 percent by weight of the composite electrolyte.

Various types of dissociable lithium salts may be used in the composite electrolyte of the present invention. Exemplary dissociable lithium salts include, but are not limited to, lithium imide, lithium triflate, lithium tetrafluoroborate, lithium perchlorate, lithium iodide, lithium trifluorocarbonate, lithium nitrate, lithium thiocyanate, lithium hexafluoroarsenate, lithium hexafluorophosphate, lithium methide, and mixtures thereof. An often used dissociable lithium salt is lithium imide.

The dissociable lithium salt may be used in various amounts, the selection of which can be made to maximize the ionic conductivity of the composite electrolyte. Preferably, the dissociable lithium salt is used in an amount ranging from about 5 to about 40 percent by weight of the composite electrolyte, and more preferably from about 15 to about 25 percent by weight of the composite electrolyte.

As stated above, the composite electrolyte includes a bulk medium which comprises the surface modified fumed silica filler and the dissociable lithium salt. For the purposes of the invention, the term "bulk medium" is to be broadly interpreted and includes various liquid and solid materials which are typically used in electrolytes. For example, the bulk medium may be in the form of a low molecular weight liquid. The term "low molecular weight" typically refers to liquids having a weight-average molecular weight of less than about 1000. Liquids of this type may include, but not be limited to, a component which may be a poly(ethylene glycol) polymer, an organic carbonate, or mixtures thereof. As used herein the phrase "poly(ethylene glycol) polymer" refers to poly(ethylene glycol) and analogs thereof. Analogs of poly(ethylene glycol) are well known to those skilled in the art and many forms are commercially available. Specific examples of poly(ethylene glycol) analogs within the scope of the present invention include but are not limited to poly(ethylene glycol) mono methyl ether, poly(ethylene glycol) dimethyl ether, and mixtures thereof.

The poly(ethylene glycol) polymer may be present in various amounts. Preferably, the poly(ethylene glycol) polymer is used in an amount no greater than about 90 percent by weight of the composite electrolyte.

A number of organic carbonates may be used in the present invention. Such organic carbonates include, but are not limited to, dimethyl carbonate, propylene carbonate, ethylene carbonate, diethyl carbonate, dimethyl carbonate, and mixtures thereof.

The organic carbonate may be present in various amounts. Preferably, the organic carbonate is used in an amount no greater than about 90 percent by weight of the composite electrolyte.

The bulk medium may also be in the form of a solid material. Most typically, a polymeric material is employed and preferably has a weight average molecular weight ranging from about 1000 to about $10^7$, more preferably from about 1000 to about $10^5$. The solid material may be used in an amount, for example, of up to about 90 percent by weight of the composite electrolyte. The solid material is prepared according to techniques which are known to one skilled in the art. As an example, a casting procedure may be used in which a solvent such as acetonitrile is employed during processing.

By virtue of its open three-dimensional crosslinked structure, the composite electrolyte has advantageous physical properties. Preferably, the composite electrolyte has an ionic conductivity of at least $10^{-4}$ Scm$^{-1}$, more preferably from about $10^{-3}$ Scm$^{-1}$ to about $10^{-2}$ Scm$^{-1}$ measured at room temperature. The composite electrolyte also has good mechanical strength with an elastic modulus preferably ranging from about $10^4$ Pa to about $10^7$ Pa. Prior to crosslinking, the electrolyte also has a shear thinning viscosity which allows it to be readily processable. Preferably, the shear thinning viscosity is about 1 poise at a shear rate of $10^3$ s$^{-1}$. The composite electrolyte also preferably exhibits an electrochemical stability characterized by a current density which may range from about 10 to about 20 $\mu$A/cm$^2$ at a voltage of about 4.5 V or above. The above physical properties are determined according to procedures known to those skilled in the art. The composite electrolyte is initially present in the form of an elastic gel or suspension. Following crosslinking, it is transformed into a stable film.

In another aspect, the invention relates to an electrochemical cell which may be used in a variety of devices such as, but not limited to, lithium and lithium-ion containing batteries, capacitors, and the like. Such devices are useful in a variety of end use applications such as, for example, chemical sensors and electrochromic windows. In general, the electrochemical cell comprises an anode, a cathode, and a composite electrolyte interposed between the anode and cathode, the composite polymeric electrolyte being described herein. In the event that porous anodes and cathodes are used, the composite electrolyte may be used to fill in the voids in the anodes and cathodes. The electrochemical cell is produced in accordance with techniques which are known in the art.

A number of anodes may be used in the electrochemical cell, the selection of which are well known to the skilled artisan. Anodes which may be used include, for example, those containing alkali metals and transition metals. Specific examples include lithium, graphite, polymers, tin-based glass oxide, and mixtures thereof. Several conventional cathodes may be used in the electrochemical cell such as, for example, $TiS_2$, $V_6O_{13}$, $FeS_2$, $LiNiO_2$, $LiCoO_2$, and $LiMn_2O_4$ cathodes. Organic sulfur compounds may be also be utilized in cathodes and include, for example, mercaptans and dimercaptans.

As alluded to herein, the invention also relates to batteries which employ the electrochemical cells and the composite electrolytes of the invention. Suitable batteries include, for example, lithium and lithium-ion batteries, those batteries being known to one skilled in the art. The distinction between these types of batteries relates to the materials used in the anode. For example, anodes used in lithium-ion batteries usually include elemental lithium intercalated in a conventional form of carbon of suitable particle size. Examples of carbon used in this application may include, but are not limited to, graphite, petroleum coke, fine charcoal, and the like. The carbon particles are typically mixed with a suitable organic binder, and the mixture is then usually cast or molded into thin squares or rectangular plates of convenient dimensions. A lithium battery, on the other hand, is one which has an anode formed from lithium metal. The term "lithium metal" is to be broadly construed and may include lithium alone or in combination with other metals as an alloy.

The invention also relates to a method of forming a composite electrolyte. The method includes reacting fumed silica with a surface bound monomer such that polymerizable groups are formed on the surface of the fumed silica. The fumed silica is then contacted with a bulk medium comprising a dissociable lithium salt, an initiator, and a second monomer which does not bind to the silica but participates in the crosslinking reaction. The mixture is typically mixed by mechanically agitating the components using agitation procedures which are known in the art. The mixture is then processed (e.g., extruded, blade coated, roll coated, and the like) into a defined geometry. The surface modified fumed silica is then polymerized such that the polymerizable groups on the surface of the fumed silica become interconnected and a three-dimensional crosslinked composite electrolyte is formed. The polymerization typically takes place between about 1 min. and about 240 min., and at a temperature ranging from about 20 deg C. to about 60 deg C.

A number of suitable initiators can be used in the above method, the selection of which are known in the art. Exemplary initiators include, for example, azobisisobutyronitrile (AIBN) and benzophenone. An initiator which is typically used is AIBN. The initiator is preferably present in amounts of less than about 1 percent based on the weight of the electrolyte.

The polymerization may be initiated by a number of techniques. For example, the polymerization may be initiated thermally, actinic radiation (e.g., photochemical by employing, for example, UV radiation), or using an electron beam. The selection of a proper initiation technique is known to one skilled in the art.

The composite electrolyte of the present invention is advantageous. For example, the electrolyte provides good mechanical strength while not adversely affecting electrical conductivity. The electrolyte may also be readily processed. Moreover, by virtue of employing the electrolyte, the need for a microporous separator in an electrochemical cell which contains the electrolyte is largely eliminated. The electrolytes also potentially exhibits improved performance in terms of: (1) containment/elimination of liquid spills of electrolyte from accidentally opened cells, (2) reduction of the solution vapor pressure through addition of high loading of fumed silica, (3) and improved interfacial stability between the anode and electrolyte.

The following examples are provided to illustrate the present invention, and should not be construed as limiting thereof. In these examples, unless otherwise specified, ACS reagent grade starting materials and solvents were used as received from commercial suppliers without further purification. Aerosil 200 fumed silica was supplied from Degussa A.G., of Frankfurt, Germany. This silica had a surface hydroxyl group content of 1 mmol OH/g and was stored over a half-saturated solution of $NH_4NO_3$ for at least one week prior to silanation reactions. Proton nuclear resonance ($^1$H NMR) analyses were carried out at room temperature in deuterated chloroform ($CDCl_3$) on a Varian Gemini-300 spectrometer with the solvent proton signals being used as chemical shift standards. A Nicolet IR/42 spectrometer purged with dry nitrogen was used to obtain infrared spectra. Samples used were 1 cm$^2$ pressed pellets prepared from ca. 10 mg of the various pure silicas. All spectra reported were acquired by signal averaging 32 scans at a resolution of 4 cm$^{-1}$. Differential scanning calorimetry (DSC) and thermogravimetric analyses (TGA) were preformed under a nitrogen atmosphere at a heating rate of 10 deg C./min on a Perkin Elmer DSC 7 and a Perkin Elmer TGA 7 instrument, respectively. The temperature was calibrated with an indium standard. For DSC measurements, samples were initially heated to 10 deg C. to erase the sample's thermal history, and then were quenched to –100 deg C. prior to starting the run. Samples for TGA measurements were first dried in a vacuum at 120 deg C. overnight. Dried samples (approximately 5 to 10 mg) were held at 115 deg C. in the TGA until a stable weight reading was obtained, and then the run was started.

Example 1

7-Octenyl Methacrylate

Example 1 illustrates the synthesis of 7-octenyl methacrylate. To a 100 mL round bottomed flask were added 30 mL of $CCl_4$, 4.0 g (31 mmol) of 7-octen-1-ol, and 8 g of crushed 3A molecular sieves. The mixture was heated to reflux and 4.4 g of (47 mmol) methacryloyl chloride in 10 mL of $CCl_4$ was added over a period of 15 min under dry $N_2$. Heating was continued overnight. The molecular sieves were removed by filtration, and after removing the solvent, the product was purified using column chromatography ($SiO_2$/hexane). The yield was 5.8 g (95%). $^1$H NMR ($CDCl_3$); δ 6.09 (s, 1H), δ 5.88–5.74 (ddt, 1H), δ 5.54 (s, 1H), δ 5.03–4.91 (m, 2H), δ 4.13 (t, 2H), δ 2.08–2.01 (dt, 2H), δ 1.94 (s, 3H), δ 1.71–1.60 (m, 2H), δ 1.44–1.30 (m, 6H). $^{13}$C NMR ($CDCl_3$): δ 167.5, δ 138.9, δ 136.5, δ 125.1, δ 114.3, δ 64.7, δ 33.6, δ 28.7, δ 287.7, δ 28.5, δ 25.8, δ 18.3. IR 3079, 1642 [ν(—CH=$CH_2$), ν(—$CH_3$C=$CH_2$)], 1713 [ν(OCO)]. MS m/z M$^+$196.

Example 2

8-Triclorosilyl Octyl Methacrylate

Example 2 represents the synthesis of 8-trichlorosilyl octyl methacrylate. In a dry box, a 13-mm Pyrex tube was charged with 5.8 g (30 mmol) of 7-octenyl methacrylate, 0.1 mL of Speier's catalyst [Speier, et al. *J. Am. Chem. Soc.* 1957, 79, 974] (0.12 M $H_2PtCl_6$ in isopropanol), and 4.8 g (35 mmol) $HSiCl_3$. The tube was sealed and heated at $60_EC$. overnight. The product was evacuated under vacuum at room temperature and stored under vacuum until use. $^1$H NMR ($CDCl_3$): δ 6.09 (s, 1H), δ 5.54 (s, 1H), δ 4.13 (t, 2H), δ 1.94 (s, 3H), δ 1.69–1.53 (m, 4H), δ 1.44–1.30 (m, 10H). $^{13}$C NMR ($CDCl_3$) : δ 167.5, δ 136.5, δ 125.2, δ 64.7, δ 31.7, δ 29.0, δ 28.9, δ 28.5, δ 25.9, δ 25.9, δ 24.3, δ 22.2, δ 18.3. IR 1640 [ν(—$CH_3$C—$CH_2$)], 1712 [ν(OCO)], 590, 567 [ν(Si—Cl)]. MS m/z M$^+$331.

Examples 3 Through 4

Examples 3 through 4 represent the syntheses of surface modified fumed silica.

Example 3

Preparation of Surface Attached Methacrylates Tethered via an Octyl Side Chain To 30 g of Aerosil 200 in a 1 L round bottomed flask were added 600 mL of toluene containing 3.0 mL (15 mmol) of diethylamine. The flask was attached to a mechanical shaker, and a mixture of 9.75 g (29 mmol) 8-(trichlorosilyl)octyl methacrylate present in 30 mL of toluene were added. The reaction was allowed to proceed at room temperature overnight. The product was separated by filtration, and washed with three portions of both toluene and ethyl ether. The residual diethyl ether was evaporated and the solid was transferred into a Schlenk flask and dried under vacuum at 120 deg C. overnight.

Example 4

Preparation of Octyl Modified Silicas with Propyl Tethered Methacrylates

To 15 g of Aerosil 200 in a 500 mL round bottomed flask were added 450 mL of toluene containing 1.5 mL (15 mmol) of diethylamine. The flask was attached to a mechanical shaker, and a mixture of 2.43 mL (9 mmol) octyltrimethoxysilane and 0.73 mL (3 mmol) of trimethoxysilylpropyl methacrylate in 30 Ml of toluene were added. The reaction was allowed to proceed at room temperature overnight. The product was separated by filtration, and washed with three portions of both toluene and diethyl ether. The residual diethyl ether was evaporated and the solid was transferred into a Schlenk flask and dried under vacuum at 120 deg C. overnight.

Example 5

To a blender cup were added 1.5 g of butyl methacrylate, 15 mg of AIBN initiator, 1.5 g of methacrylate-modified fumed silica, and 12 g of a PEGDME-500/$LiClO_4$ solution with the desired O/Li ratio. The mixture was mixed in a Waring blender for 2–5 minutes and then was transferred to a vial. After evacuation to remove air bubbles, the sample was stored in a desiccator until used. Polymerization of the composite electrolyte was initiated with a 450 W medium pressure UV lamp. Samples were placed approximately 3 cm from the lamp, and were exposed until rubbery. Crosslinking was performed under nitrogen and in air; curing under nitrogen allowed shorter reaction times.

Example 6

Figure 4:
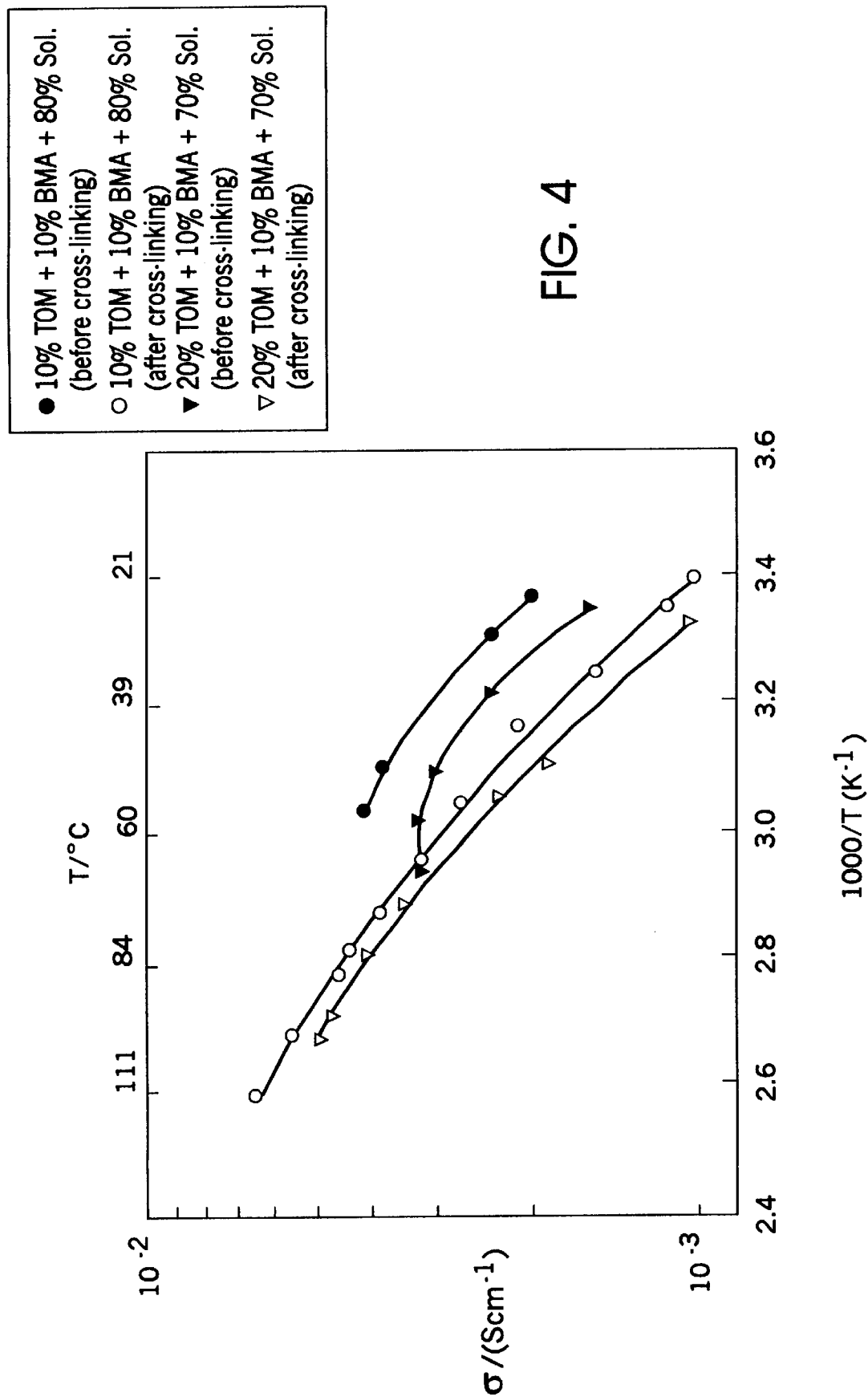
FIG. 4 is a graph illustrating the ionic conductivity of a composite electrolyte before and after thermally induced crosslinking.

Electrolyte samples were prepared which contained functionalized A200 fumed silica with octyl and methacrylate groups (TOM). The samples contained a solution of lithium imide as the dissociable lithium salt, and dimethyl capped PEG (Li:O of 1:20). Butyl methacrylate (BMA) was added to the solutions along with free radical initiators, and the mixtures were exposed to thermal conditions which initiated the polymerization. FIG. 4 illustrates the ionic conductivities for the composite electrolytes. As shown, conductivites in excess of $10^{-3}$ S/cm were observed.

Example 7

Figure 3:
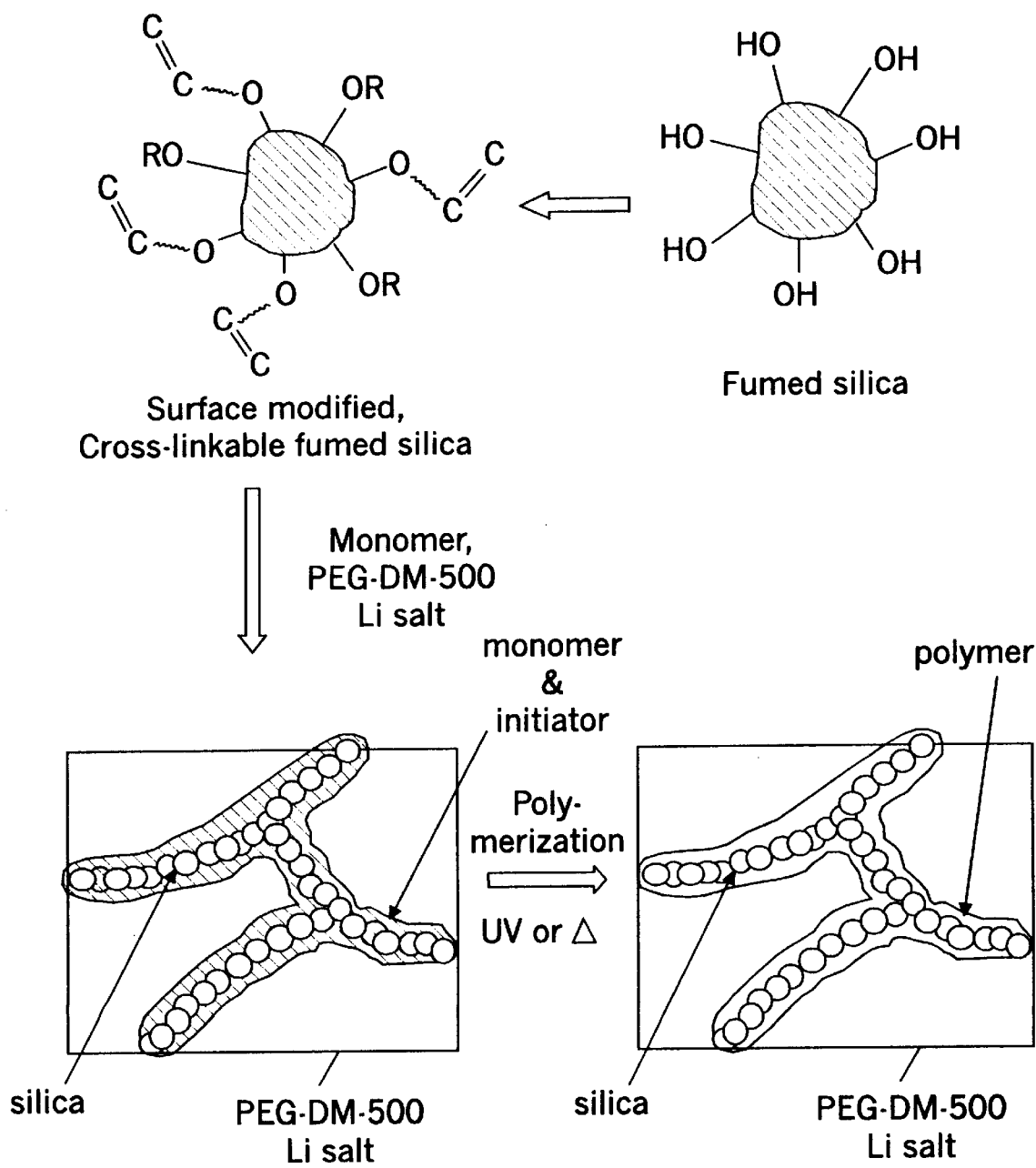
FIG. 3 is a schematic representation illustrating the steps involved in preparing a composite electrolyte. As a first step, surface-modified fumed silica is prepared as illustrated in FIG. 2. The silica is then dispersed in a base matrix (e.g., polyethylene glycol-dimethylether (PEG-DM)/lithium (Li) salt), and subsequently a small quantity of polymerizable monomer is added to the system (e.g., butyl methacrylate). Finally, in the presence of an initiator (e.g., AIBN), the material is crosslinked to yield a network structure, schematically represented in this figure.

FIG. 3 represents a synthetic route for producing a crosslinked composite electrolyte. A200 fumed silica was reacted with a combination of surface groups such as, for example, an octyl chain with different coverages of tethered methacrylates. The length of the tether was varied, and it was found that both $C_3$ and $C_8$ tethers gave useful composites. The functionalized silicas were combined with PEG-DM, AIBN, or benzophenone (free radical initiators), $LiClO_4$ or Li imide, and methyl, butyl, or octyl methacrylate to form stable clear gels. Upon irradiation with UV light, polymerization of both the tethered methacrylate and the added methacrylate took place, yielding a cross-linked rubbery material.

Example 8

Fumed silica/PEG-DM composite electrolytes were prepared according to procedures of the present invention. The composite electrolytes contained 10 percent of methacrylate-functionalized fumed silica and 10 percent butyl methacrylate in a PEG-DM/$LiClO_4$ matrix. Dynamic moduli (elastic, G' and viscous G") were measured before and after crosslinking, as illustrated in FIG. 5. As shown, the crosslinked electrolytes exhibited improved moduli values relative to non-crosslinked electrolytes.

The foregoing is illustrative of the present invention and is not to be construed as limiting thereof. The invention is defined by the following claims, with equivalents of the claims to be included therein.

That which is claimed is:

1. A composite electrolyte comprising:
   (a) a filler comprising surface modified fumed silica particles, wherein said surface modified fumed silica comprises polymerizable groups on the surface thereof, said polymerizable groups being covalently bonded to each other in a chemical reaction such that said surface modified fumed silica filler is bridged by polymer chains formed from the polymerizable groups, the surface modified fumed silica filler being crosslinked and present as a three-dimensional structure and;
   (b) a dissociable lithium salt; and
   (b) a bulk medium which contains said surface modified fumed silica filler and said dissociable lithium salt.

2. The composite electrolyte according to claim 1, wherein said bulk medium comprises a liquid component selected from the group consisting of a poly(ethylene glycol) polymer having a weight average molecular weight of less than about 1000, an organic carbonate, and mixtures thereof.

3. The composite electrolyte according to claim 2, wherein said poly(ethylene glycol) polymer is selected from the group consisting of poly(ethylene glycol), poly(ethylene glycol) mono methyl ether, poly(ethylene glycol) dimethyl ether, and mixtures thereof.

4. The composite electrolyte according to claim 2, wherein said organic carbonate is selected from the group consisting of dimethyl carbonate, propylene carbonate, ethylene carbonate, and mixtures thereof.

5. The composite electrolyte according to claim 1, wherein said bulk medium comprises material having a weight average molecular weight ranging from about 1000 to about $10^7$.

6. The composite electrolyte according to claim 1, wherein said dissociable lithium salt is selected from the group consisting of lithium imide, lithium triflate, lithium tetrafluoroborate, lithium perchlorate, lithium iodide, lithium trifluorocarbonate, lithium nitrate, lithium thiocyanate, lithium hexafluoroarsenate, and mixtures thereof.

7. The composite electrolyte according to claim 1, wherein said electrolyte has an ionic conductivity measured at room temperature ranging from about $10^{-3}$ to about $10^{-2}$ Scm$^{-1}$.

8. The composite electrolyte according to claim 1, wherein said electrolyte has an elastic modulus ranging from about $10^4$ to about $10^7$ Pa.

9. The composite electrolyte according to claim 1, wherein said composite electrolyte has an electrochemical stability characterized by a current density ranging from about 10 to about 20 $\mu$A/cm$^2$ at a voltage of at least about 4.5 V.

10. The composite electrolyte according to claim 1, wherein said electrolyte comprises:
    (a) from about 1 to about 50 percent by weight of surface modified fumed silica filler, wherein said surface modified fumed silica comprises polymerizable groups on the surface thereof, said polymerizable groups being bonded to each other such that said surface modified fumed silica filler is crosslinked in a three-dimensional structure;
    (b) from about 5 to about 40 percent by weight of a dissociable lithium salt; and
    (c) up to about 90 percent by weight of a bulk medium which contains said surface modified fumed silica filler and said dissociable lithium salt.

11. An electrochemical cell comprising:
    (a) an anode;
    (b) a cathode; and
    (c) interposed between said anode and said cathode, a composite electrolyte, wherein said composite electrolyte comprises:
       (i) a filler comprising surface modified fumed silica particles, wherein said surface modified fumed silica comprises polymerizable groups on the surface thereof, said polymerizable groups being covalently bonded to each other in a chemical reaction such that said surface modified fumed silica filler is bridged by polvmer chains formed from the polymerizable groups, the surface modified fumed silica filler being crosslinked and present as a three-dimensional structure;
       (ii) a dissociable lithium salt; and
       (iii) a bulk medium which contains said surface modified fumed silica filler and said dissociable lithium salt.

12. The electrochemical cell according to claim 11, wherein said anode is a lithium anode.

13. The electrochemical cell according to claim 11, wherein said cathode is selected from the group consisting of $TiS_2$, $V_6O_{13}$, $FeS_2$, $LiNiO_2$, $LiCO_2$, $LiMn_2O_4$, and organic sulfur cathodes.

14. The electrochemical cell according to claim 11, wherein said bulk medium comprises a liquid component selected from the group consisting of a poly(ethylene glycol) polymer having a weight average molecular weight of less than about 1000, an organic carbonate, and mixtures thereof.

15. The electrochemical cell according to claim 14, wherein said poly(ethylene glycol) polymer is selected from the group consisting of poly(ethylene glycol), poly(ethylene glycol) mono methyl ether, poly(ethylene glycol) dimethyl ether, and mixtures thereof.

16. The electrochemical cell according to claim 14, wherein said organic carbonate is selected from the group consisting of dimethyl carbonate, propylene carbonate, ethylene carbonate, and mixtures thereof.

17. The electrochemical cell according to claim 11, wherein said bulk medium comprises material having a weight average molecular weight ranging from about 1000 to about $10^7$.

18. The electrochemical cell according to claim 11, wherein said dissociable lithium salt is selected from the group consisting of lithium imide, lithium triflate, lithium tetrafluoroborate, lithium perchlorate, lithium iodide, lithium trifluorocarbonate, lithium nitrate, lithium thiocyanate, lithium hexafluoroarsenate, and mixtures thereof.

19. The electrochemical cell according to claim 11, wherein said electrolyte has an ionic conductivity measured at room temperature ranging from about $10^{-3}$ to about $10^{-2}$ Scm$^{-1}$.

20. The electrochemical cell according to claim 12, wherein said electrolyte has an elastic modulus ranging from about $10^4$ to about $10^7$ Pa.

21. The electrochemical cell according to claim 12, wherein said composite electrolyte has an electrochemical stability characterized by a current density ranging from about 10 to about 20 $\mu$A/cm$^2$ at a voltage of at least about 4.5 V.

22. A battery comprising:
    (a) an anode;
    (b) a cathode; and (c) interposed between said anode and said cathode, a composite electrolyte, wherein said composite electrolyte comprises:
(i) a filler comprising surface modified fumed silica particles, wherein said surface modified fumed silica comprises polymerizable groups on the surface thereof, said polymerizable groups being covalently bonded to each other in a chemical reaction such that said surface modified fumed silica filler is bridged by polymer chains formed from the polymerizable groups, the surface modified fumed silica filler being crosslinked and present as a three-dimensional structure;
(ii) a dissociable lithium salt; and
(iii) a bulk medium which contains said surface modified fumed silica filler and said dissociable lithium salt.

23. The battery according to claim 22, wherein said bulk medium comprises a liquid component selected from the group consisting of a poly(ethylene glycol) polymer having a weight average molecular weight of less than about 1000, an organic carbonate, and mixtures thereof.

24. The battery according to claim 23, wherein said poly(ethylene glycol) polymer is selected from the group consisting of poly(ethylene glycol), poly(ethylene glycol) mono methyl ether, poly(ethylene glycol) dimethyl ether, and mixtures thereof.

25. The battery according to claim 23, wherein said organic carbonate is selected from the group consisting of dimethyl carbonate, propylene carbonate, ethylene carbonate, and mixtures thereof.

26. The battery according to claim 22, wherein said bulk medium comprises material having a weight average molecular weight ranging from about 1000 to about $10^7$.

27. The battery according to claim 22, wherein said dissociable lithium salt is selected from the group consisting of lithium imide, lithium triflate, lithium tetrafluoroborate, lithium perchlorate, lithium iodide, lithium trifluorocarbonate, lithium nitrate, lithium thiocyanate, lithium hexafluoroarsenate, and mixtures thereof.

28. The battery according to claim 22, wherein said electrolyte has an ionic conductivity measured at room temperature ranging from about $10^{-3}$ to about $10^{-2}$ Scm$^{-1}$.

29. The battery according to claim 22, wherein said electrolyte has an elastic modulus ranging from about $10^4$ to about $10^7$ Pa.

30. The battery according to claim 22, wherein said electrolyte has an electrochemical stability characterized by having a current density ranging from about 10 to about 20 $\mu$A/cm$^2$ at a voltage of at least about 4.5 V.

31. The battery according to claim 22, wherein said battery is a lithium battery.

32. The battery according to claim 22, wherein said battery is a lithium-ion battery.

33. A method of producing a composite electrolyte comprising:
reacting fumed silica with a surface monomer to modify the surface of the fumed silica, wherein polymerizable groups become present on the surface of the fumed silica;
contacting the fumed silica with a bulk medium comprising a dissociable lithium salt, an initiator, and a monomer which does not react with the surface of the fumed silica but is capable of reacting with the polymerizable groups;
processing the mixture into a defined geometry; and
polymerizing the mixture such that the polymerizable groups on the surface of the fumed silica become covalently bonded to each other in a chemical reaction such that the surface modified fumed silica filler is bridged by polymer chains formed from the polymerizable groups, and wherein a three-dimensional composite electrolyte structure is formed.

34. The method according to claim 33, wherein said polymerization step is thermally initiated.

35. The method according to claim 33, wherein said polymerization step is initiated by actinic radiation.

36. The method according to claim 33, wherein said polymerization step is initiated by utilizing an electron beam.

37. A composite electrolyte comprising:
(a) a surface modified fumed silica filler, wherein said surface modified fumed silica comprises polymerizable groups on the surface thereof, said polymerizable groups being covalently bonded to each other in a chemical reaction such that said surface modified fumed silica filler is bridged by polymer chains formed from the polymerizable groups, the surface modified fumed silica being crosslinked and present as a three-dimensional structure, and wherein said surface modified fumed silica filler has at least one methacrylate-terminated oligomeric chain on the surface thereof;
(b) a dissociable lithium salt; and
(c) a bulk medium which contains said surface modified fumed silica filler and said dissociable lithium salt.

38. The composite electrolyte according to claim 37, wherein said methacrylate-terminated oligomeric chain is connected to a $C_1$ to $C_{16}$ hydrocarbon group.

39. The composite electrolyte according to claim 37, wherein said bulk medium comprises a liquid component selected from the group consisting of poly(ethylene glycol) polymer having a weight average molecular weight of less than about 1000, an organic carbonate, and mixtures thereof.

40. The composite electrolyte according to claim 37, wherein said electrolyte has an ionic conductivity measured at room temperature ranging from about $10^{-3}$ to about $10^{-2}$ Scm$^{-1}$.

41. An electrochemical cell comprising:
(a) an anode;
(b) a cathode; and
(c) interposed between said anode and said cathode, a composite electrolyte, wherein said composite electrolyte comprises:
(i) surface modified fumed silica filler, wherein said surface modified fumed silica comprises polymerizable groups on the surface thereof, said polymerizable groups being covalently bonded to each other in a chemical reaction such that said surface modified fumed silica filler is bridged by polymer chains formed from the polymerizable groups, the surface modified fumed silica being crosslinked and present as a three-dimensional structure, and wherein said surface modified fumed silica filler has at least one methacrylate-terminated oligomeric chain on the surface thereof;
(ii) a dissociable lithium salt; and
(iv) a bulk medium which contains said surface modified fumed silica filler and said dissociable lithium salt.

42. The electrochemical cell according to claim 41, wherein said methacrylate-terminated oligomeric chain is connected to a $C_1$ to $C_{16}$ hydrocarbon group.

43. The electrochemical cell according to claim 41, wherein said bulk medium comprises a liquid component selected from the group consisting of poly(ethylene glycol) polymer having a weight average molecular weight of less than about 1000, an organic carbonate, and mixtures thereof.

44. The electrochemical cell according to claim 37, wherein said electrolyte has an ionic conductivity measured at room temperature ranging from about $10^{-3}$ to about $10^{-2}$ Scm$^{-1}$.

45. A battery comprising:
(a) an anode;
(b) a cathode; and
(c) interposed between said anode and said cathode, a composite electrolyte, wherein said composite electrolyte comprises:
(i) surface modified fumed silica filler, wherein said surface modified fumed silica comprises polymerizable groups on the surface thereof, said polymerizable groups being bonded covalently to each other in a chemical reaction such that said surface modified fumed silica filler is bridged by polymer chains formed from the polymerizable groups, the surface modified fumed silica being crosslinked and present as a three-dimensional structure, and wherein said surface modified fumed silica filler has at least one methacrylate-terminated oligomeric chain on the surface thereof;
(ii) a dissociable lithium salt; and
(iii) a bulk medium which contains said surface modified fumed silica filler and said dissociable lithium salt.

46. The batttery according to claim 45, wherein said methacrylate-terminated oligomeric chain is connected to a $C_1$ to $C_{16}$ hydrocarbon group.

47. The battery according to claim 45, wherein said bulk medium comprises a liquid component selected from the group consisting of poly(ethylene glycol) polymer having a weight average molecular weight of less than about 1000, an organic carbonate, and mixtures thereof.

48. The battery according to claim 45, wherein said electrolyte has an ionic conductivity measured at room temperature ranging from about $10^{-3}$ to about $10^{-2}$ Scm$^{-1}$.

49. A method of producing a composite electrolyte comprising:
reacting fumed silica with a surface reactive monomer to modify the surface of the fumed silica, wherein a polymerizable group becomes present on the surface of the fumed silica, said surface modiifed fumed silica filler having a methacrylate-terminated oligomeric chain on the surface thereof;
contacting said fumed silica with a bulk medium comprising a dissociable lithium salt, an initiator, and a monomer which does not react with the surface of the fumed silica but is capable of reacting with the polymerizable group;
processing the mixture into a defined geometry where the fumed silica filler is bridged by polymer chains formed from the polymerizable group; and
polymerizing the mixture such that the polymerizable groups on the surface of the fumed silica become bonded and a three-dimensional composite structure is formed.

50. The method according to claim 49, wherein said methacrylate-terminated oligomeric chain is connected to a $C_1$ to $C_{16}$ hydrocarbon group.

51. The method according to claim 49, wherein said bulk medium comprises a liquid component selected from the group consisting of poly(ethylene glycol) polymer having a weight average molecular weight of less than about 1000, an organic carbonate, and mixtures thereof.

52. The method according to claim 49, wherein said electrolyte has an where the fumed silica filler is bridged by polymer chains formed from the polymerizable group, ionic conductivity measured at room temperature ranging from about $10^{31\ 3}$ to where the fumed silica filler is bridged by polymer chains formed from the polymerizable group, about $10^{31\ 2}$ Scm$^{-1}$.

* * * * *

UNITED STATES PATENT AND TRADEMARK OFFICE
CERTIFICATE OF CORRECTION

PATENT NO. : 5,965,299
DATED : October 12, 1999
INVENTOR(S) : Khan et al.

It is certified that error appears in the above-identified patent and that said Letters Patent is hereby corrected as shown below:

Column 14, claim 49,
Line 7, "modiifed" should read -- modified --.

Column 14, claim 52,
Lines 32-38, claim 52 should read -- The method according to claim 49, wherein said electrolyte has an ionic conductivity measured at room temperature ranging from about $10^{-3}$ to about $10^{-2}$ $Scm^{-1}$. --

Signed and Sealed this

Sixth Day of November, 2001

*Attest:*

*Attesting Officer*

NICHOLAS P. GODICI
*Acting Director of the United States Patent and Trademark Office*